(12) United States Patent
Jeong

(10) Patent No.: US 7,986,683 B2
(45) Date of Patent: Jul. 26, 2011

(54) SYSTEM FOR SETTING ROUTER IDENTIFIER IN NETWORK SUPPORTING AT LEAST ONE PROTOCOL AND METHOD OF CONTROLLING THE SAME

(75) Inventor: Jee-Won Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 12/319,439

(22) Filed: Jan. 7, 2009

(65) Prior Publication Data

US 2009/0175288 A1 Jul. 9, 2009

(30) Foreign Application Priority Data

Jan. 8, 2008 (KR) .................. 10-2008-0002183

(51) Int. Cl.
*H04L 12/28* (2006.01)
(52) U.S. Cl. ........................ 370/351; 370/389
(58) Field of Classification Search ........... 370/351–389
See application file for complete search history.

(56) References Cited

U.S. PATENT DOCUMENTS

| | | | |
|---|---|---|---|
| 2002/0032766 A1* | 3/2002 | Xu | 709/223 |
| 2002/0032797 A1* | 3/2002 | Xu | 709/238 |
| 2002/0035639 A1* | 3/2002 | Xu | 709/238 |
| 2005/0185582 A1* | 8/2005 | Wybenga et al. | 370/230 |
| 2005/0195831 A1* | 9/2005 | Wybenga et al. | 370/395.31 |
| 2005/0213585 A1* | 9/2005 | Sturm et al. | 370/395.31 |
| 2005/0232261 A1* | 10/2005 | Wybenga et al. | 370/389 |
| 2009/0225675 A1* | 9/2009 | Baum et al. | 370/252 |

* cited by examiner

*Primary Examiner* — Ayaz R Sheikh
*Assistant Examiner* — Mounir Moutaouakil

(57) ABSTRACT

A system for setting a router identifier in a network supporting at least one protocol. The system includes an interface storage storing information about at least one port and its Internet protocol address, a router identifier storage storing information about a reference router identifier, an interface manager referring to the interface storage to set information about the Internet protocol address of the port having the highest priority as the reference router identifier, and storing a value of the reference router identifier in the router identifier storage, and at least one daemon process accessing the router identifier storage when automatically setting the router identifier in conjunction with the generation of an event, looking up the value of the reference router identifier, and setting the stored reference router identifier as the router identifier thereof.

20 Claims, 5 Drawing Sheets

SYSTEM FOR SETTING ROUTER IDENTIFIER IN NETWORK SUPPORTING AT LEAST ONE PROTOCOL AND METHOD OF CONTROLLING THE SAME

CROSS-REFERENCE TO RELATED APPLICATION(S) AND CLAIM OF PRIORITY

This application makes reference to and claims all benefits accruing under 35 U.S.C. §119 from an application for "SYSTEM FOR SETTING ROUTER IDENTIFIER IN NETWORK SUPPORTING AT LEAST ONE PROTOCOL AND METHOD OF CONTROLLING THE SAME" earlier filed in the Korean Intellectual Property Office on Jan. 8, 2008 and there duly assigned Serial No. 2008-2183.

TECHNICAL FIELD OF THE INVENTION

The present invention relates to technology that creates, changes, and deletes a router identifier (ID) in a router network system using at least one protocol.

BACKGROUND OF THE INVENTION

In these days of the information society, new information is innumerably created, deleted and changed under very high speed network environments day after day.

Under an environment in which the network is connected at any place, a tendency to hold the information in common is gradually increasing.

A wired/wireless network environment is essential to hold the information in common. Data required for this network environment are sent in the format of a packet.

The data sent in the packet format are always sent to specified destinations through routes (paths), for instance, in broadcasting services.

Routing equipment such as a Layer 3 switch (L3 switch) or a router is required to determine the routes of the packets and guarantee effective, rapid transmission of traffic.

In order to determine the routes for transmission of the packets in routing equipment or in order to determine the paths (routes) between heterogeneous networks or between homogeneous networks, various routing protocols such as Open Shortest Path First (OSPF), Border Gateway Protocol (BGP), Router Information Protocol (RIP), MultiProtocol Label Switching (MPLS), OSPF version 3 (OSPFv3), and so forth are used.

A best route between pieces of equipment is determined using these routing protocols.

In order to use these routing protocols, the routers have their own identifier (ID) for mutual identification.

This ID generally uses an Internet Protocol (IP) address assigned to the interface of a system.

The ID used to identify the router is called a router ID, which is used by OSPF, BGP, RIP, MPLS, and so forth.

The router ID can be used for all kinds of communication equipment using the routing protocols and can be indispensable for effective operation of the communication equipment.

As illustrated in FIG. 1, a conventional network using at least one of these routing protocols includes an interface storage 10, an interface manager 20, one or more daemon processes 30-1 to 30-n, an command line interface (CLI) 40 and an event manager 50.

The router ID can be set through the CLI 40 by a user or be automatically set in the system if not set by the user. In detail, the router ID is automatically set in such a manner to designate the highest-priority IP address among IP addresses that loopback interfaces of the system have.

Here, the daemon processes 30-1 to 30-n get access to the interface storage 10 whenever the router ID is set, and then search for the highest-priority IP address among the IP addresses of the loopback interfaces or search and designate the highest-priority IP address among the IP addresses of the loopback interfaces through the interface manager 20.

The router ID is determined when each protocol is enabled. At that time, the router ID is adapted to set the highest-priority IP address of the loopback interface.

In other words, each of BGP, RIP and MPLS uses the highest-priority IP address of the loopback interface when enabled.

At this time, the router IDs used must be independently set for the respective protocols, and may be set independently or equally.

BGP uses one router ID for only one of the daemon processes 30-1 to 30-n enabled in the system, and OSPF uses the router IDs for the respective daemon processes 30-1 to 30-n.

Thus, the router IDs must be set for the respective daemon processes.

Meanwhile, MPLS must use the router IDs for the respective daemon processes 30-1 to 30-n because it operates the numerous daemon processes 30-1 to 30-n.

In this network supporting one or more protocols, the router IDs must be set for the respective protocols, and can be used for the IP addresses that are not set.

In the case of MPLS, the router ID must be set as the actual IP address assigned to the system.

However, in a network supporting one or more protocols, in the case in which the router ID is set when each protocol is enabled or when each of the daemon processes 30-1 to 30-n is enabled, a load is applied to the system because the highest-priority IP address must be looked up.

Further, in the network supporting one or more protocols, the router ID is fixed when each protocol is enabled. Thus, the router ID cannot be changed while using the protocol. In detail, when the router IDs of the daemon processes 30-1 to 30-n are required for immediate change while operating the network, a daemon or process of each protocol must be downed and then driven again.

SUMMARY OF THE INVENTION

To address the above-discussed deficiencies of the prior art, it is a primary object of the present invention to provide a system for setting a router identifier (ID) in a network supporting at least one protocol and a method of controlling the same, in which the router IDs of all processes can be simultaneously or individually set, changed, and deleted in a network system using at least one protocol.

According to an aspect of the invention, there is provided a system for setting a router identifier in a network supporting at least one protocol. The system includes: an interface storage storing information about at least one port and its Internet protocol address; a router identifier storage storing information about a reference router identifier; an interface manager referring to the interface storage to set information about the Internet protocol address of the port having the highest priority as the reference router identifier, and storing a value of the reference router identifier in the router identifier storage; and at least one daemon process accessing the router identifier storage when automatically setting the router identifier in conjunction with a generation of an event, looking up the value of the reference router identifier, and setting the stored reference router identifier as the router identifier thereof.

In an embodiment of the present invention, the system may further include an event manager, when the Internet protocol address setting for at least one of the ports is changed, transmitting a signal to the interface manager informing the interface manager of the change in the Internet protocol address of the port such that the information about the reference router identifier stored in the router identifier storage can be changed through the interface manager.

In another embodiment of the present invention, when receiving a command having information about a router identifier update mode from a user through a command line interface when the user intends to simultaneously update the router identifiers of the daemon processes through the command line interface, the interface manager may provide the reference router identifier to at least one of the daemon processes when the router identifier is requested from the daemon process.

In another embodiment of the present invention, when receiving a command having information about the router identifiers and a router identifier update mode from a user through a command line interface when the user intends to reset the router identifier of at least one of the daemon processes through the command line interface, the interface manager may set the router identifier, which is provided through the command line interface by the user, as the reference router identifier, and store the set router identifier in the router identifier storage.

In another embodiment of the present invention, the information about the router identifier update mode may be selected from information about a passive mode that sets the router identifier designated through the interface manager by the user as the reference router identifier of the router identifier storage and that resets the router identifier according to an operation of at least one of the daemon processes, and information about a forced mode that sets the router identifier designated through the interface manager by the user as the reference router identifier of the router identifier storage and that resets the set reference router identifier as the router identifier of at least one of the daemon processes.

According to another aspect of the present invention, there is provided a method of controlling a system for setting a router identifier in a network supporting at least one protocol. The method includes the steps of: referring to, by an interface manager, an interface storage storing information about at least one port and its Internet protocol address, and setting information about the Internet protocol address of the port having the highest priority as a reference router identifier; storing, by the interface manager, the router identifier set as the reference router identifier in a router identifier storage; and accessing, by at least one daemon process, the router identifier storage when automatically setting the router identifier in conjunction with a generation of an event, looking up a value of the reference router identifier, and setting the stored reference router identifier as the router identifier of the daemon process.

In an embodiment of the present invention, the method may further include the step of, when the Internet protocol address setting for at least one of the ports is changed, transmitting, by an event manager, a signal to the interface manager informing the interface manager of the change in the Internet protocol address of the port such that the information about the reference router identifier stored in the router identifier storage can be changed through the interface manager.

In another embodiment of the present invention, the method may further include the steps of: when a user intends to simultaneously update the router identifiers of the daemon processes through a command line interface, transmitting, by the user, a command having information about a router identifier update mode to the interface manager through the command line interface; and providing, by the interface manager, the reference router identifier to at least one of the daemon processes when the router identifier is requested from the daemon process.

In another embodiment of the present invention, the method may further include the steps of: when a user intends to reset the router identifier of at least one of the daemon processes through a command line interface, transmitting, by the user, a command having information about the router identifiers and a router identifier update mode to the interface manager through the command line interface; and setting, by the interface manager, the router identifier, which is provided through the command line interface by the user, as the reference router identifier, and storing the set router identifier in the router identifier storage.

In another embodiment of the present invention, the information about the router identifier update mode may be selected from information about a passive mode that sets the router identifier designated through the interface manager by the user as the reference router identifier of the router identifier storage and that resets the router identifier according to an operation of at least one of the daemon processes, and information about a forced mode that sets the router identifier designated through the interface manager by the user as the reference router identifier of the router identifier storage and that resets the set reference router identifier as the router identifier of at least one of the daemon processes.

As described above, according to embodiments of the present invention, the system for setting a router identifier (ID) in a network supporting at least one protocol and the method of controlling the same separately manage the router IDs, so that, when the router IDs are created/changed/deleted, the interface manager reflects the separately managed router IDs, and thus it is unnecessary to look up the router IDs whenever the protocol is set.

Further, when the router ID is reset, it is unnecessary to down and up the protocol again.

Unlike the prior art in which the router ID is not manually deleted when the protocol is upped, and thus all the protocols cannot be deleted until they are disabled, the protocol can be deleted regardless of whether the protocol is enabled or disabled.

Further, according to the operation policy of the system or circumstances of the network, an administer can select whether or not to allow the change of the router ID to be immediately reflected on the protocol, to be reflected when a new process of the protocol is created, or to be collectively reflected only when the protocol is reset.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged router network system.

A system for setting a router identifier (ID) in a network supporting at least one protocol, and a method of controlling the same according to an exemplary embodiment of the present invention will be described below with reference to the accompanying drawings. It will be understood to those skilled in the art that the following system is merely referred to for description of the embodiment, and thus does not limit the subject matter of the present invention.

Figure 1:
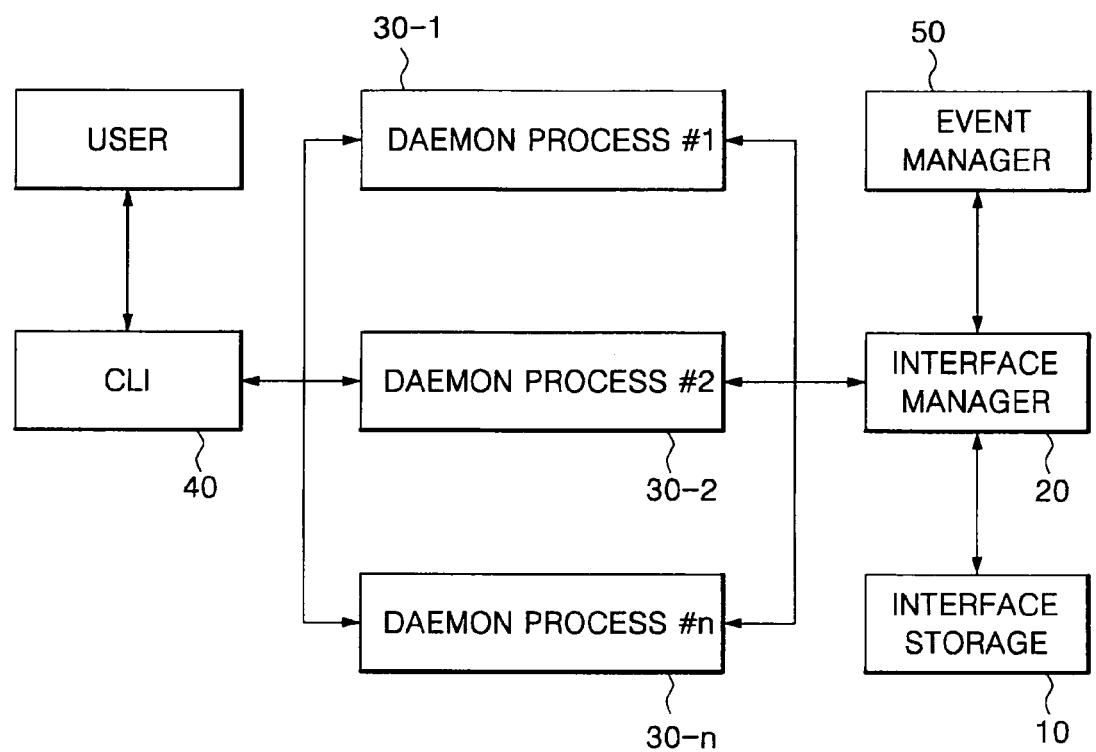
FIG. 1 is a functional block diagram illustrating the configuration of a conventional system for setting a router ID in a network supporting at least one protocol.
Figure 2:
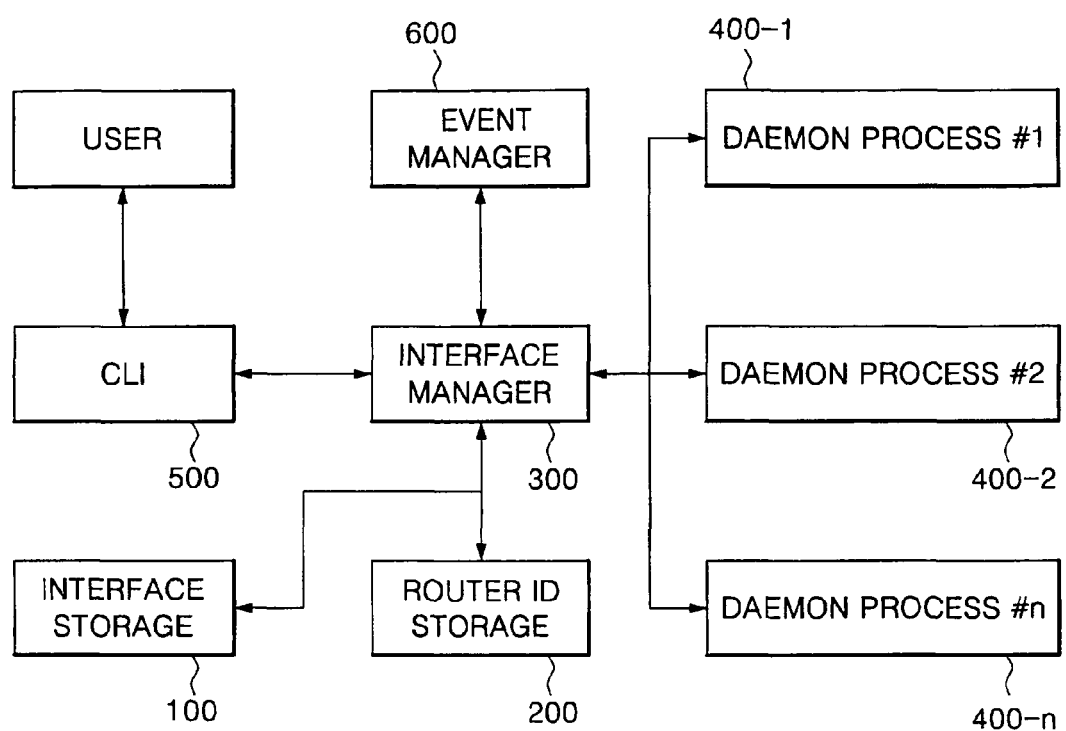
FIG. 2 is a functional block diagram illustrating the configuration of a system for setting a router ID in a network supporting at least one protocol according to an embodiment of the present invention.

FIG. 2 is a block diagram illustrating the configuration of a system for setting a router ID in a network supporting at least one protocol according to an embodiment of the present invention. The system for setting a router ID in a network supporting at least one protocol includes an interface storage 100, a router ID storage 200, an interface manager 300, one or more daemon processes 400-1 to **400-*n*, an command line interface (CLI) 500, and an event manager 600**.

The interface storage 100 stores information about one or more ports and their Internet protocol (IP) addresses.

The router ID storage 200 stores information about a reference router ID.

Further, the interface manager 300 refers to the interface storage 100, and then sets information about the IP address of the port having highest priority as the reference router ID. Then, the interface manager 300 stores a value of the reference router ID in the router ID storage 200.

When automatically setting the router ID in conjunction with the generation of an event, at least one of the daemon processes 400-1 to **400-*n* gets access to the router ID storage 200**, looks up the value of the reference router ID, and then sets the stored reference router ID as its router ID.

Meanwhile, when the IP address set for at least one of the ports is changed, the event manager 600 transmits a signal to the interface manager 300 informing the interface manager 300 of the change in the IP address of the port such that the information about the reference router ID stored in the router ID storage 200 can be changed through the interface manager 300.

When intending to simultaneously update the router IDs of the daemon processes 400-1 to **400-*n* through the CLI 500, a user transmits a command, which includes information about the system, identifiers, daemon processes, and router ID update mode, to the interface manager 300 through the CLI 500. When the router ID is requested from at least one of the daemon processes 400-1 to 400-*n*, the interface manager 300 provides the reference router ID to at least one of the daemon processes 400-1 to 400-*n***.

In contrast, when intending to reset the router IDs of the daemon processes 400-1 to **400-*n* through the CLI 500, a user transmits a command, which includes information about the system, identifiers, daemon processes, and router ID update mode, to the interface manager 300 through the CLI 500. Then, when the router ID is requested from at least one of the daemon processes 400-1 to 400-*n*, the interface manager 300 sets the router ID, which is provided through the CLI 500 by the user, as the reference router ID, and then stores it in the router ID storage 200**.

Here, the router ID update mode information is one selected from passive mode information and forced mode information, wherein the passive mode information is for setting the router ID designated through the interface manager 300 by the user as the reference router ID of the router ID storage 200, and then resetting the router ID according to an operation of the daemon processes 400-1 to **400-*n*, whereas the forced mode information is for setting the router ID designated through the interface manager 300 by the user as the reference router ID of the router ID storage 200, and then resetting the set reference router ID as the router ID of the daemon processes 400-1 to 400-*n***.

The description of the aforementioned components will be oriented to operation associated with the subject matter of the present invention, instead of typical functions and operation.

First, the system for setting a router ID in a network supporting at least one protocol employs one or more daemon processes 400-1 to **400-*n*. Here, the daemon processes 400-1 to 400-*n*** can use various protocols such as OSPF, BGP, RIP, MPLS and OSPFv3.

Meanwhile, the interface storage 100 stores information about one or more ports and their IP addresses.

Afterwards, the interface manager 300 refers to the interface storage 100, sets information about the IP address of the port having highest priority as a reference router ID, and stores the reference router ID in the router ID storage 200.

At this time, the system for setting a router ID in a network supporting at least one protocol is configured to automatically set the router ID.

Thus, each of the daemon processes 400-1 to **400-*n* uses one of the protocols. When the router ID is set, at least one of the daemon processes 400-1 to 400-*n* gets access to the router ID storage 200**, looks up the reference router ID, and then sets the stored reference router ID as its router ID.

Meanwhile, when the IP address set for at least one of the ports is changed, the event manager 600 transmits a signal to the interface manager 300 informing the interface manager 300 of the change in the IP address of the port such that the information about the reference router ID stored in the router ID storage 200 can be changed through the interface manager 300.

Then, the interface manager 300 looks up the interface storage 100, sets the information about the IP address of the port having highest priority as the reference router ID, and stores the reference router ID in the router ID storage 200.

On one hand, when intending to simultaneously update the router IDs of the daemon processes 400-1 to 400-n through the CLI 500, a user transmits a command, which includes information about the system, identifiers, daemon processes, and router ID update mode, to the interface manager 300 through the CLI 500. In detail, the user transmits a command called "ubigate(config)#router ospf 100 passive" to the interface manager 300 through the CLI 500.

Then, when the router ID is requested from at least one of the daemon processes 400-1 to 400-n, the interface manager 300 provides the reference router ID to at least one of the daemon processes 400-1 to 400-n.

On the other hand, when intending to reset the router IDs of the daemon processes 400-1 to 400-n through the CLI 500, a user transmits a command, which includes information about the system, identifiers, daemon processes, and router ID update mode, to the interface manager 300 through the CLI 500. In detail, the user transmits a command called "ubigate(config)#router ID 3.3.3.3 passive" to the interface manager 300 through the CLI 500.

Then, the interface manager 300 sets the router ID, 3.3.3.3, which is provided through the CLI 500 by the user, as the reference router ID, and then stores it in the router ID storage 200.

Afterwards, the interface manager 300 provides the reference router ID, 3.3.3.3, to at least one of the daemon processes 400-1 to 400-n when the router ID is requested by at least one of the daemon processes 400-1 to 400-n.

Here, the router ID update mode information is one selected from passive mode information and forced mode information, wherein the passive mode information is for setting the router ID designated through the interface manager 300 by the user as the reference router ID of the router ID storage 200, and then resetting the router ID according to an operation of the daemon processes 400-1 to 400-n, whereas the forced mode information is for setting the router ID designated through the interface manager 300 by the user as the reference router ID of the router ID storage 200, and then resetting the set reference router ID as the router ID of the daemon processes 400-1 to 400-n.

Figure 3:
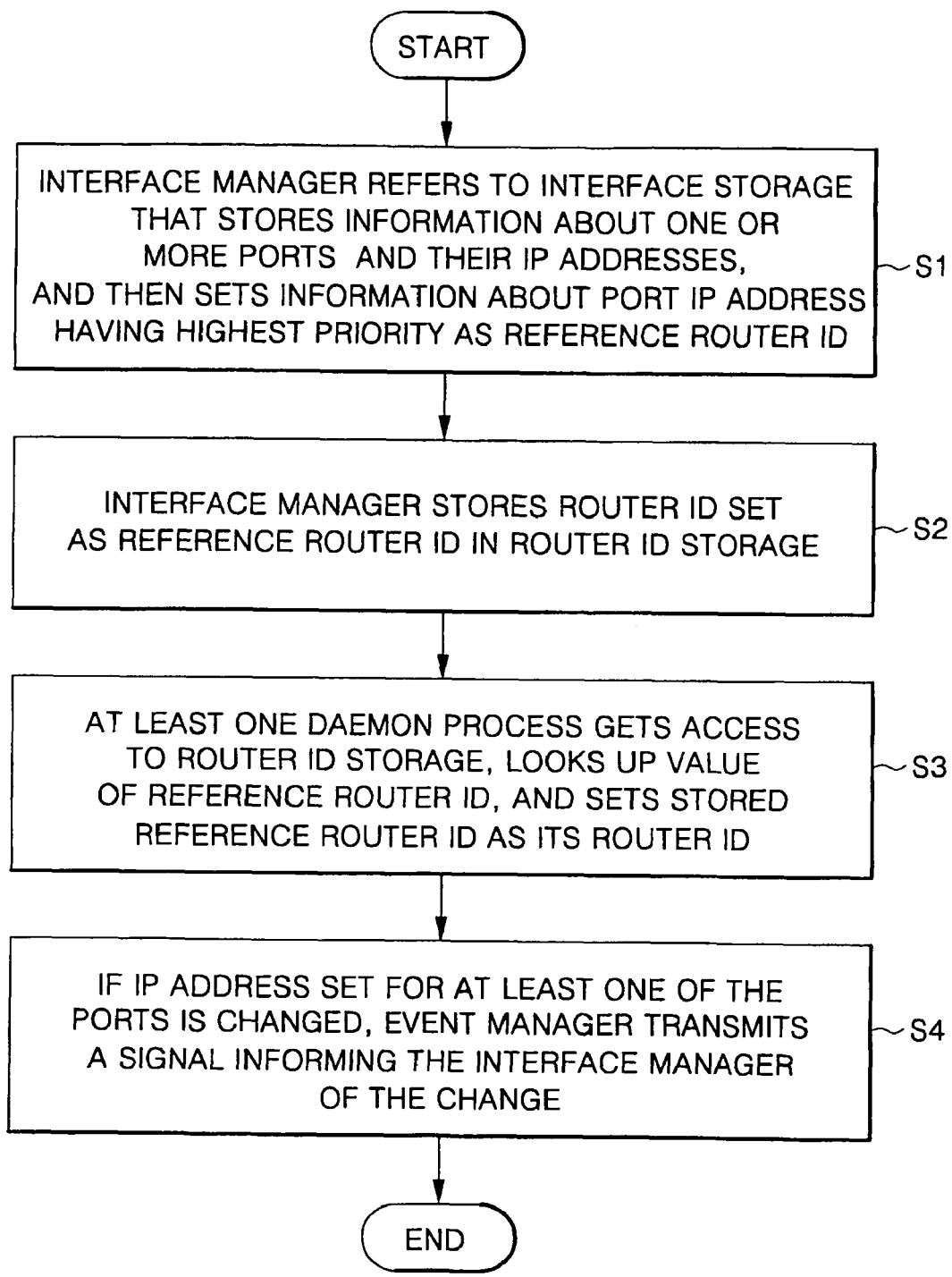
FIG. 3 is a flow chart illustrating a method of controlling a system for setting a router ID in a network supporting at least one protocol according to an embodiment of the present invention.

Now, a method of controlling the system for setting a router ID in a network supporting at least one protocol according to an embodiment of the present invention will be described below with reference to FIGS. 3 through 5.

First, the interface manager 300 refers to the interface storage 100 that stores information about one or more ports and their IP addresses, and then sets the information about the IP address of the port having highest priority as a reference router ID (S1).

Subsequently, the interface manager 300 stores the router ID set as the reference router ID in the router ID storage 200 (S2).

Then, when automatically setting the router ID in conjunction with the generation of an event, at least one of the daemon processes 400-1 to 400-n gets access to the router ID storage 200, looks up a value of the reference router ID, and then sets the stored reference router ID as its router ID (S3).

If the IP address set for at least one of the ports is changed, the event manager 600 transmits a signal to the interface manager 300 informing the interface manager 300 of the change in the IP address of the port such that the information about the reference router ID stored in the router ID storage 200 can be changed through the interface manager 300 (S4).

Figure 4:
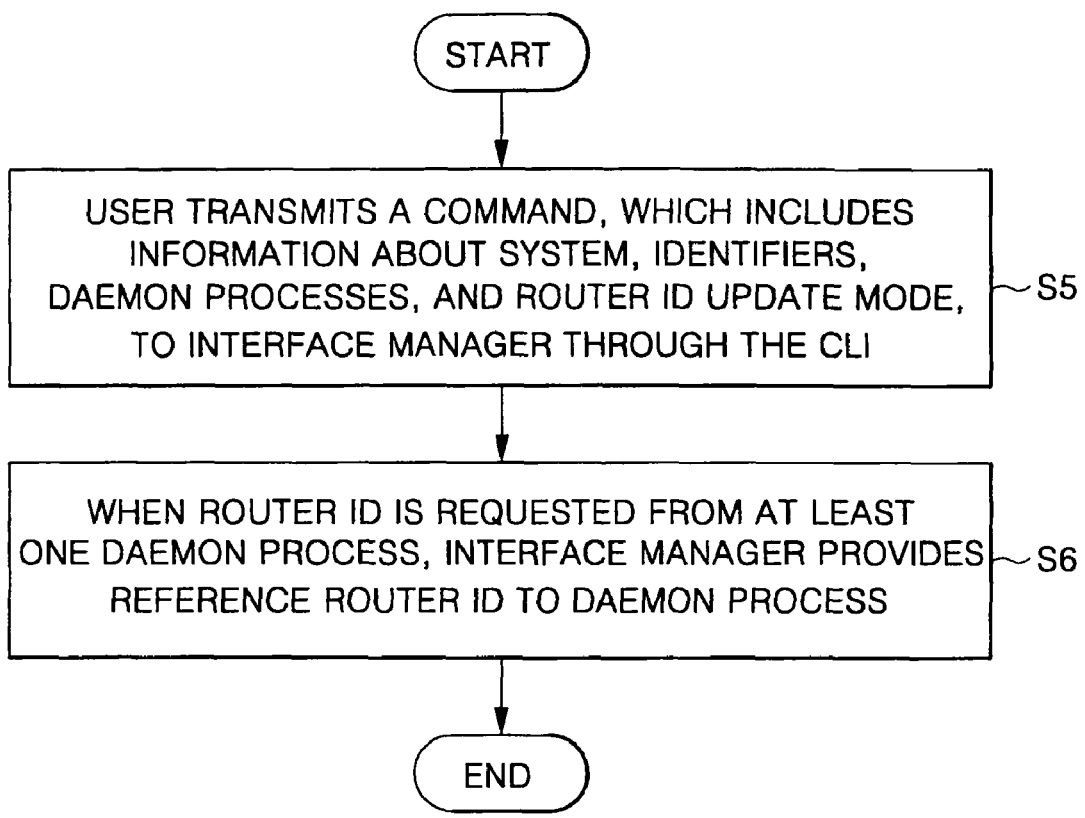
FIG. 4 is a flow chart illustrating a process of automatically setting a router ID by a user in a method of controlling a system for setting a router ID in a network supporting at least one protocol according to an embodiment of the present invention.

On one hand, when intending to simultaneously update the router IDs of the daemon processes 400-1 to 400-n through the CLI 500, a user transmits a command, which includes information about the system, identifiers, daemon processes, and router ID update mode, to the interface manager 300 through the CLI 500, as illustrated in FIG. 4 (S5).

Then, when the router ID is requested from at least one of the daemon processes 400-1 to 400-n, the interface manager 300 provides the reference router ID to at least one of the daemon processes 400-1 to 400-n (S6).

Figure 5:
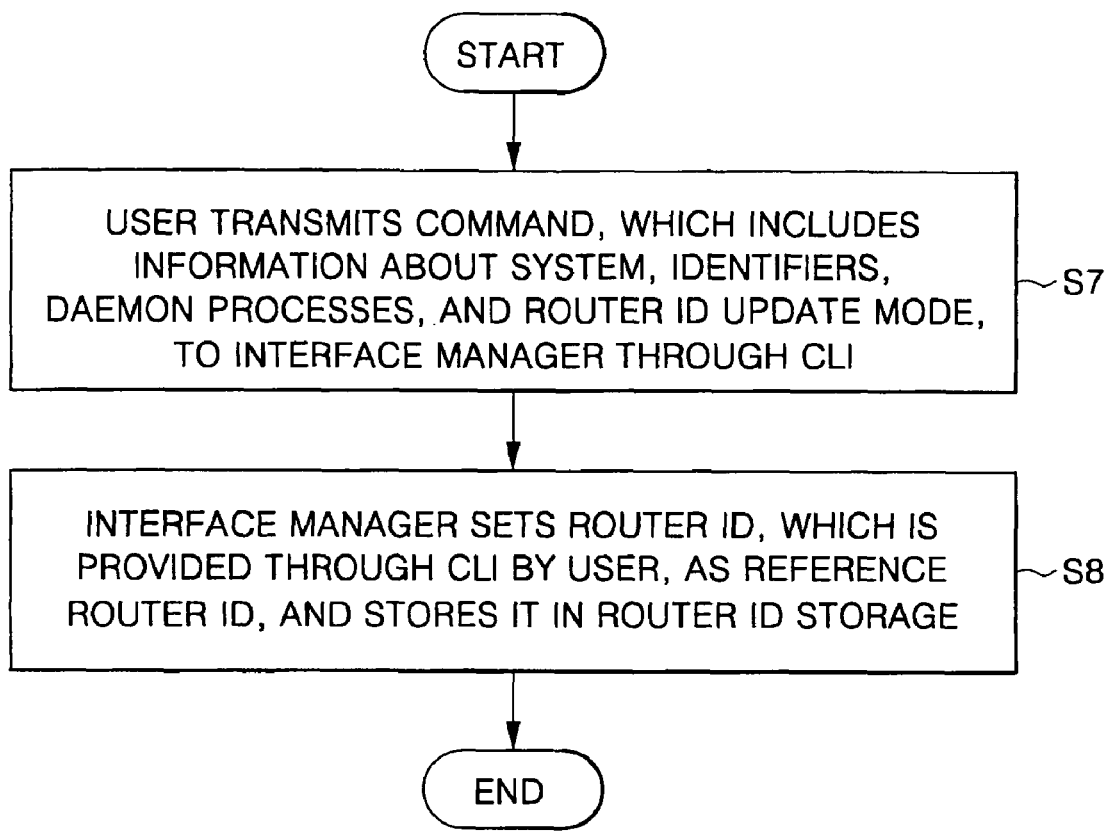
FIG. 5 is a flow chart illustrating a process of manually setting a router ID by a user in a method of controlling a system for setting a router ID in a network supporting at least one protocol according to an embodiment of the present invention.

On the other hand, when intending to reset the router IDs of the daemon processes 400-1 to 400-n through the CLI 500, a user transmits a command, which includes information about the system, identifiers, daemon processes, and router ID update mode, to the interface manager 300 through the CLI 500, as illustrated in FIG. 5 (S7).

Then, the interface manager 300 sets the router ID, which is provided through the CLI 500 by the user, as the reference router ID, and then stores it in the router ID storage 200 (S8).

Here, the router ID update mode information is one selected from passive mode information and forced mode information, wherein the passive mode information is for setting the router ID designated through the interface manager 300 by the user as the reference router ID of the router ID storage 200, and then resetting the router ID according to an operation of the daemon processes 400-1 to 400-n, whereas the forced mode information is for setting the router ID designated through the interface manager 300 by the user as the reference router ID of the router ID storage 200, and then resetting the set reference router ID as the router ID of the daemon processes 400-1 to 400-n.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for setting a router identifier in a network supporting at least one protocol, the system comprising:
   an interface storage storing information on at least one port and its Internet protocol address;
   a router identifier storage storing information about a reference router identifier;
   an interface manager referring to the interface storage to set information about the Internet protocol address of the port having the highest priority as the reference router identifier, and storing a value of the reference router identifier in the router identifier storage; and
   at least one daemon process accessing the router identifier storage when automatically setting the router identifier in conjunction with a generation of an event, looking up the value of the reference router identifier, and setting the stored reference router identifier as a router identifier thereof.

2. The system according to claim 1, further comprising an event manager, when an Internet protocol address setting for at least one of the ports is changed, transmitting a signal to the interface manager informing the interface manager of the change in the Internet protocol address of the port such that the information about the reference router identifier stored in the router identifier storage can be changed through the interface manager.

3. The system according to claim 2, wherein, when receiving a command having information about a router identifier update mode from a user through a command line interface when the user intends to simultaneously update the router identifiers of the daemon processes through the command line interface, the interface manager provides the reference router identifier to at least one of the daemon processes when the router identifier is requested from the daemon process.

4. The system according to claim 2, wherein, when receiving a command having information about the router identifiers and a router identifier update mode from a user through a command line interface when the user intends to reset the router identifier of at least one of the daemon processes through the command line interface, the interface manager sets the router identifier, which is provided through the command line interface by the user, as the reference router identifier, and stores the set router identifier in the router identifier storage.

5. The system according to claim 4, wherein the information about the router identifier update mode is information about a passive mode that sets the router identifier designated through the interface manager by the user as the reference router identifier of the router identifier storage and that resets the router identifier according to an operation of at least one of the daemon processes or information about a forced mode that sets the router identifier designated through the interface manager by the user as the reference router identifier of the router identifier storage and that resets the set reference router identifier as the router identifier of at least one of the daemon processes.

6. A method of controlling a system for setting a router identifier in a network supporting at least one protocol, the method comprising:
referring to, by an interface manager, an interface storage storing information about at least one port and its Internet protocol address, and setting information about the Internet protocol address of the port having the highest priority as a reference router identifier;
storing, by the interface manager, the router identifier set as the reference router identifier in a router identifier storage; and
accessing, by at least one daemon process, the router identifier storage when automatically setting the router identifier in conjunction with a generation of an event, looking up a value of the reference router identifier, and setting the stored reference router identifier as the router identifier of the daemon process.

7. The method according to claim 6, further comprising: when the Internet protocol address setting for at least one of the ports is changed, transmitting, by an event manager, a signal to the interface manager informing the interface manager of the change in the Internet protocol address of the port such that the information about the reference router identifier stored in the router identifier storage can be changed through the interface manager.

8. The method according to claim 7, further comprising:
when a user intends to simultaneously update the router identifiers of the daemon processes through a command line interface,
transmitting a command having information about a router identifier update mode to the interface manager through the command line interface; and
providing, by the interface manager, the reference router identifier to at least one of the daemon processes when the router identifier is requested from the daemon process.

9. The method according to claim 7, further comprising:
when a user intends to reset the router identifier of at least one of the daemon processes through a command line interface,
transmitting a command having information about the router identifiers and a router identifier update mode to the interface manager through the command line interface; and
setting, by the interface manager, the router identifier, which is provided through the command line interface by the user, as the reference router identifier, and storing the set router identifier in the router identifier storage.

10. The method according to claim 9, wherein the information about the router identifier update mode is information about a passive mode that sets the router identifier designated through the interface manager by the user as the reference router identifier of the router identifier storage and that resets the router identifier according to an operation of at least one of the daemon processes or information about a forced mode that sets the router identifier designated through the interface manager by the user as the reference router identifier of the router identifier storage and that resets the set reference router identifier as the router identifier of at least one of the daemon processes.

11. A system for setting a router identifier in a network supporting at least one protocol, the system comprising:
an interface storage storing information on at least one port and its Internet protocol address;
a router identifier storage storing information about a reference router identifier;
an interface manager setting information about the Internet protocol address of the port having the highest priority as the reference router identifier in the interface storage, and storing a value of the reference router identifier in the router identifier storage; and
at least one daemon process automatically setting the router identifier upon a generation of an event by accessing the router identifier storage, looking up the value of the reference router identifier, and setting the stored reference router identifier as a router identifier thereof.

12. The system according to claim 11, further comprising an event manager transmitting a signal to the interface manager informing the interface manager of a change in the Internet protocol address of the port such that the information about the reference router identifier stored in the router identifier storage can be changed through the interface manager.

13. The system according to claim 12, wherein, when receiving a command having information about a router identifier update mode from a user through a command line interface when the user intends to simultaneously update the router identifiers of the daemon processes through the command line interface, the interface manager provides the reference router identifier to at least one of the daemon processes when the router identifier is requested from the daemon process.

14. The system according to claim 12, wherein, when receiving a command having information about the router identifiers and a router identifier update mode from a user through a command line interface when the user intends to reset the router identifier of at least one of the daemon processes through the command line interface, the interface manager sets the router identifier, which is provided through the command line interface by the user, as the reference router identifier, and stores the set router identifier in the router identifier storage.

15. The system according to claim 14, wherein the information about the router identifier update mode is information about a passive mode that sets the router identifier designated through the interface manager by the user as the reference router identifier of the router identifier storage and that resets the router identifier according to an operation of at least one of the daemon processes or information about a forced mode that sets the router identifier designated through the interface manager by the user as the reference router identifier of the router identifier storage and that resets the set reference router identifier as the router identifier of at least one of the daemon processes.

16. A method of controlling a system for setting a router identifier in a network supporting at least one protocol, the method comprising:
  accessing, by an interface manager, an interface storage storing information on at least one port and its Internet protocol address, and setting information about the Internet protocol address of the port having the highest priority as a reference router identifier;
  storing, by the interface manager, the router identifier set as the reference router identifier in a router identifier storage; and
  accessing, by at least one daemon process, the router identifier storage when automatically setting the router identifier upon a generation of an event, looking up a value of the reference router identifier, and setting the stored reference router identifier as the router identifier of the daemon process.

17. The method according to claim 16, further comprising: when the Internet protocol address setting for at least one of the ports is changed, receiving, from an event manager, a signal informing the interface manager of the change in the Internet protocol address of the port such that the information about the reference router identifier stored in the router identifier storage can be changed through the interface manager.

18. The method according to claim 17, further comprising:
  when a user intends to simultaneously update the router identifiers of the daemon processes through a command line interface,
  receiving, by the interface manager, a command having information about a router identifier update mode through the command line interface; and
  providing, by the interface manager, the reference router identifier to at least one of the daemon processes when the router identifier is requested from the daemon process.

19. The method according to claim 17, further comprising:
  when a user intends to reset the router identifier of at least one of the daemon processes through a command line interface,
  receiving, by the interface manager, a command having information about the router identifiers and a router identifier update mode through the command line interface; and
  setting, by the interface manager, the router identifier, which is provided through the command line interface by the user, as the reference router identifier, and storing the set router identifier in the router identifier storage.

20. The method according to claim 19, wherein the information about the router identifier update mode is information about a passive mode that sets the router identifier designated through the interface manager by the user as the reference router identifier of the router identifier storage and that resets the router identifier according to an operation of at least one of the daemon processes or information about a forced mode that sets the router identifier designated through the interface manager by the user as the reference router identifier of the router identifier storage and that resets the set reference router identifier as the router identifier of at least one of the daemon processes.

* * * * *